J. E. TRAVIS.
Gang Plow.
No. 47,686.
Patented May 9, 1865.
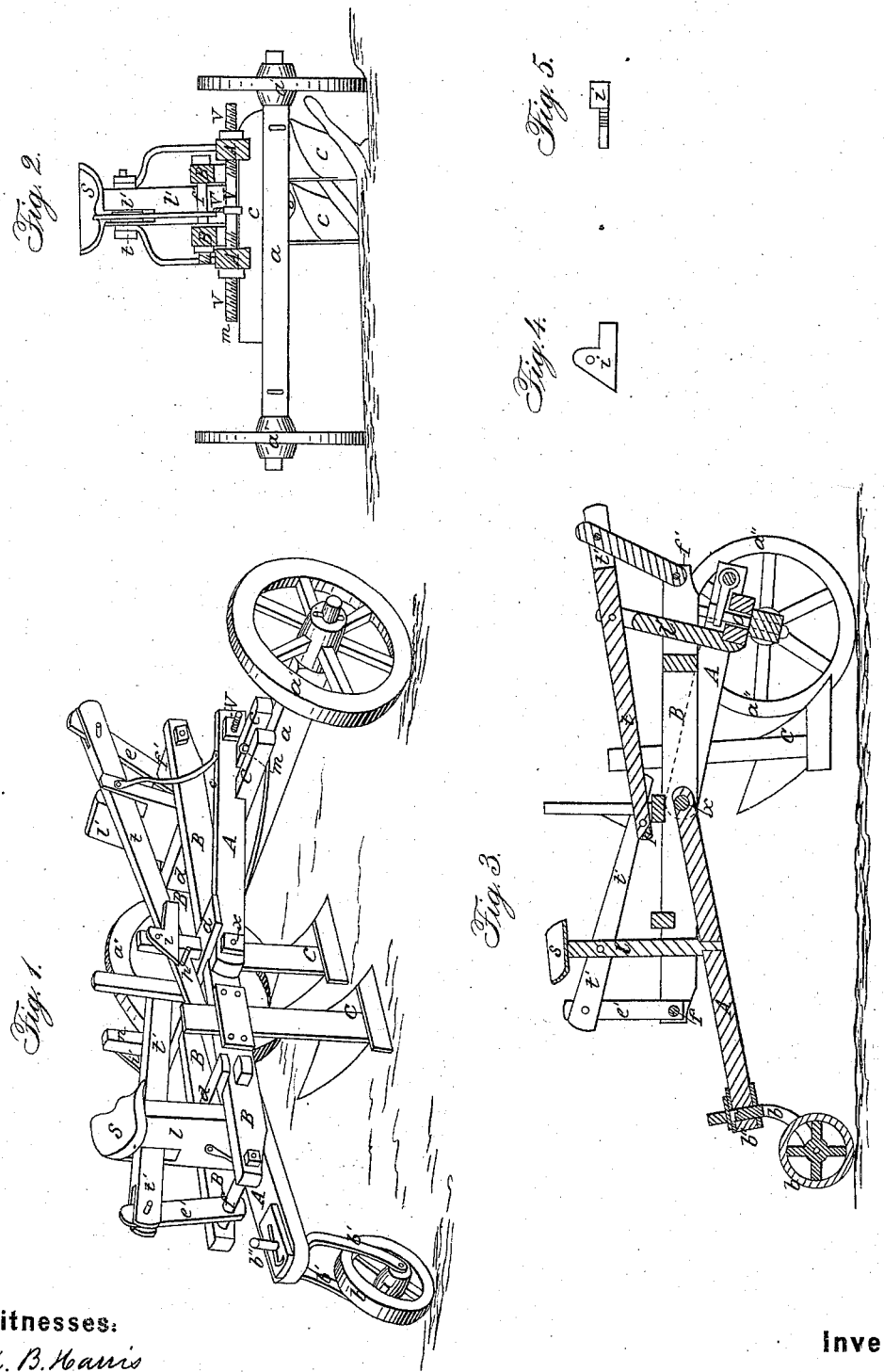
Witnesses:
M. B. Harris
M. Randolph
Inventor:
J. E. Travis

UNITED STATES PATENT OFFICE.

JOHN E. TRAVIS, OF GREENVILLE, ILLINOIS, ASSIGNOR TO HIMSELF AND ELON FRANCISCO, OF SAME PLACE.

IMPROVED GANG-PLOW.

Specification forming part of Letters Patent No. 47,686, dated May 9, 1865.

*To all whom it may concern:*

Be it known that I, JOHN E. TRAVIS, of the town of Greenville, county of Bond, and State of Illinois, have invented a new and useful Improvement in Gang-Plows; and I do hereby declare that the following is a full, clear, and exact description thereof, which will enable those skilled in the art to make and use the same, reference being had to the accompanying drawings and letters of reference marked thereon, and forming a part of this specification, in which—

Figure 1 is a perspective view of the machine with the plows lifted out of the ground. Fig. 2 is a front end view with the plows in the ground. Fig. 3 is a bisecting longitudinal section with the plows lifted out of the ground. Fig. 4 is a side view of the hook $i$. Fig. 5 is a top view of the hook $i$.

The nature of the invention consists in so constructing the frames for carrying the plows and the operating-levers that the plows may be lifted out of the ground at either the front or the back end, or at both together. In ordinary instances they will be raised out of the ground at the front end first, thereby lifting the point of the plow first and causing it to rise to the surface of the ground by its own action while rising up an inclined plane of easy ascent.

The frame A, which supports the plows, is carried at the front end upon the axles $a$ and the wheels $a'$ $a''$, and at the rear end upon the wheel $b$ and its connecting-frame $b'$, which is attached to the frame A by means of the swivel-joint at $b''$. The frame A consists of three pieces of timber, of suitable size and material, so arranged that two of them are placed outside of and contiguous to the forward part of the frame B, to the center of which the rear ends of them are attached by means of the assembling-bolt $x$, while the front ends of them are securely fastened to the head-blocks $c$ and $c'$, which rest upon and connect them with the axle $a$. The remaining piece of the frame A is placed between the side pieces of the frame B, so that its forward end is connected with the frame B by the assembling-bolt $x$ passing through it, while its rear end is supported by the swivel-wheel $b$.

The frame B is constructed of two side or sill pieces, securely framed together by means of the transverse beams $d$ and bolts $f$ and $f'$, and is attached to the frame A by means of the assembling-bolt $x$.

The plows C C are securely attached to the side timbers of the frame B. The lever $t$, acting upon the fulcrum $l'$, which is erected upon the head-block $c'$, and the forward part of the frame B, through the medium of the link $e$ and bolt $f'$, will raise or lower that end of the frame at the will of the operator. The fulcrum $l$ is erected upon the rear piece of the frame A at a suitable distance in front of the bolt $f$ in the frame B, so that the lever $t'$, acting upon the fulcrum $l$ and the frame B through the medium of the link $e$ and the bolt $f$, will cause the back end of the frame B to be raised or lowered at the will of the operator. The front ends of the two outside pieces of the frame A are framed into the two head-blocks $c$ and $c'$ at such an angle of inclination to the longitudinal axis of them that when the wheel $a''$ is in the furrow while the machine is in operation the side planes of the timbers of the frame A will be vertical, and consequently the land sides of the plows C C will be vertical also, they being attached to the sides of the frame B in the same plane as the sides of the frame A. This construction is clearly shown in Fig. 2. The head-blocks $c$ and $c'$ are framed into the side timbers of the frame A, with a space between them sufficient to admit the free passage of the king-bolt $o$. (Clearly shown in Fig. 3.) The king-bolt $o$ has a link, $v'$, securely attached to its upper end. The other end of the link $v'$ is securely attached to the bolt $v$, which passes through the forward ends of the frame A. By loosening and tightening the nuts on the opposite ends of the bolt $v$ at the same time the frame A, with its head-blocks $c$ and $c'$, is caused to slide on the axle $a$ either toward or from the unplowed land, thus making the plows cut a wide or a narrow furrow at the will of the operator.

The bolt $m$ (clearly shown in Fig. 1) is inserted between the head-blocks $c$ and $c'$ into a suitable mortise prepared in the axle $a$, thus making the forward coupling a stiff one, and depending for the facility of turning the machine around upon the swivel-wheel at the rear end of the machine. Upon removing the bolt $m$ the coupling at both ends may be loose.

The levers $t$ and $t'$ are provided with a pin, $p$, protruding from their sides at a point in their longitudinal axis contiguous to the posts $n\ n$, which are provided with the hooks $i$ and $i'$. (Clearly shown in Figs. 1, 4, and 5.)

The operator, sitting upon the seat S, while having both hands engaged in managing the reins of the team, places his feet upon the levers $t$ and $t'$. When he desires the plows to enter the ground he pushes his foot against the hook $i$, which has held down the lever $t$, and causes it to release its hold upon the pin $p$ of the lever $t$, which, being thus disengaged, lets fall the front end of the frame B upon the head-blocks $c$ and $c'$. By releasing the front end of the frame B first the points of the plows C and C will strike the ground first, and consequently enter it easily. As soon as the front end is released the operator will release the lever $t'$ from the hook $i$ in a similar manner to that in which he released the lever $t$. The plows being in the ground, the operator will place his foot upon the lever $t$ first and press it down so the pin $p$ will fall below the bottom of the hook $i$. By raising the front end of the frame B up first the points of the plows will be raised first, thus causing them to run out of the ground by their own action while ascending an inclined plane of easy ascent, requiring but little exertion on the part of the operator.

The hooks $i$ and $i'$ are shaped, as shown in Figs. 4 and 5, with a square shoulder on the side of them toward the posts $n\ n$. These shoulders, resting against the posts $n\ n$, prevent the pointed end of them from rising beyond the desired point it is necessary for them to hold the pin $p$. The excess of metal being in the opposite end from the pin $p$ causes the hook to fall by its own weight, so that the shoulder of it will rest against the posts $n$.

Having thus described my invention, what I claim as new, and desire to secure the use of by Letters Patent, is—

1. The combination of the plow-frame B and its attached plows with the fixed frame A by means of a fulcrum-pin, $x$, or other similar hinged joint, substantially in the manner and for the purpose herein set forth.

2. The employment of the levers $t$ and $t'$ with their fulcrums $l$ and $l'$ and their connecting-links $e$ and $e'$ and their bolts $f$ and $f'$, when combined with the frame B, substantially as and for the purposes set forth.

J. E. TRAVIS. [L. S.]

Witnesses:
 U. B. HARRIS,
 M. RANDOLPH.